United States Patent
Caviezel et al.

(10) Patent No.: US 8,075,301 B2
(45) Date of Patent: Dec. 13, 2011

(54) SUCTION BLOWMOLD FOR PRODUCING EXTRUSION SUCTION-BLOWMOLDED PLASTIC MOLDED PARTS

(75) Inventors: Heinz Caviezel, Chur (CH); Martin Hirt, Menzingen (CH); Ralph Kettl, Paspels (CH)

(73) Assignee: EMS-Chemie AG, Domat/EMS (CH)

( * ) Notice: Subject to any disclaimer, the term of this patent is extended or adjusted under 35 U.S.C. 154(b) by 887 days.

(21) Appl. No.: 11/933,547

(22) Filed: Nov. 1, 2007

(65) Prior Publication Data

US 2008/0171163 A1 Jul. 17, 2008

(30) Foreign Application Priority Data

Jan. 11, 2007 (EP) .................................. 07 100 390

(51) Int. Cl.
*B29C 49/48* (2006.01)
(52) U.S. Cl. ........................................................ 425/522
(58) Field of Classification Search .................... 425/522
See application file for complete search history.

(56) References Cited

U.S. PATENT DOCUMENTS

| | | | | |
|---|---|---|---|---|
| 2,669,752 | A * | 2/1954 | Pratt | 264/540 |
| 3,097,398 | A * | 7/1963 | Inglesby | 425/170 |
| 4,645,447 | A | 2/1987 | Sumitomo | |
| 4,865,799 | A | 9/1989 | Sadr | |
| 5,271,882 | A * | 12/1993 | Shirahata et al. | 264/509 |
| 5,443,868 | A * | 8/1995 | Oda et al. | 428/35.7 |
| 5,705,254 | A | 1/1998 | Morinaga et al. | |
| 6,660,216 | B1 * | 12/2003 | Porter | 264/523 |
| 2007/0087076 | A1 * | 4/2007 | Larson et al. | 425/532 |
| 2009/0280208 | A1 * | 11/2009 | Sato et al. | 425/522 |

FOREIGN PATENT DOCUMENTS

| | | |
|---|---|---|
| EP | 0301694 | 2/1989 |
| EP | 0659534 | 6/1995 |
| EP | 0659535 | 6/1995 |
| EP | 0796715 | 9/1997 |
| EP | 0863351 | 9/1998 |
| EP | 1040904 | 10/2000 |
| EP | 1394197 | 3/2004 |
| GB | 1114270 A * | 5/1968 |
| JP | 60096433 A | 5/1985 |
| JP | 05185498 A * | 7/1993 |
| JP | 08057943 | 3/1996 |

(Continued)

OTHER PUBLICATIONS

Mechanical translation of JP 05-185498 A dated Jul. 1993.*

(Continued)

*Primary Examiner* — Robert B Davis
(74) *Attorney, Agent, or Firm* — Browdy and Neimark, PLLC

(57) ABSTRACT

A suction blowmold (1) having a cavity (3) formed by two mold halves (9) for producing extrusion suction-blowmolded plastic molded parts (10) using the suction-blowing method, in which an extruded, plastically deformable preform (2) in the form of a plastic melt tube is brought into the closed cavity (3) and in position in the cavity at least partially sliding on the mold surface (5). The suction blowmold (1) according to the present invention is characterized in that at least a part of the mold surface (5) of the cavity (3) has a structuring which provides a reduced sliding friction to the preform (2). A method for producing such a suction blowmold (1), the use thereof for producing extrusion suction-blowmolded plastic molded parts (10), and corresponding extrusion suction-blowmolded plastic molded parts (10) are additionally disclosed.

6 Claims, 3 Drawing Sheets

FOREIGN PATENT DOCUMENTS

| | | | |
|---|---|---|---|
| JP | 08183086 A | * | 7/1996 |
| JP | 10244582 A | | 9/1998 |
| JP | 2005035184 A | | 2/2005 |
| WO | 2004/054782 A1 | | 7/2004 |

OTHER PUBLICATIONS

Mechanical translation of JP 08-183086 A dated Jul. 1996.*
Mechanical translation of JP 2005-035184 A dated Feb. 2005.*
Prystay, et al., "Application of Termography for the Optimization of the Blow Moulding Process," 1996, Industrial Materials Institute—National Research Council Canada, 75 De Mortagne, Boucherville, Quebec Canada J4B 6Y4, XP002440336 Gefunden im Internet: URL:http://www.knovel.com/knovel2/databook/pdf/902/F48E23462CD6744F9595379EEBAD5BB.pdf> [gefunden am Jun. 29, 2007] * das ganze Dokument.
Michaeli, Walter, "Einfuhrung in Die Kunststoffverarbeitung," 1999. Carl Hanser Verlag, Munich, Germany.
Sasse, Renford E. "Abfallarmes Blasformen Komplexer Formteile," Sep. 1993 Jahrgang.
Pfleger., "Blasformbare Polyamide," Kunststoffe 86 (1996)1, Carl Hanser Verlag, Munich, Germany.
Daubenbuchel, "Vefahrens-Und Maschinentechnik Der 3D-Technologie," Bonn, Germany.
Bottenbruch, L, et al., "Polyamide," Kunstoff-Handbuch, 1998. Germany.

* cited by examiner

Fig. 2
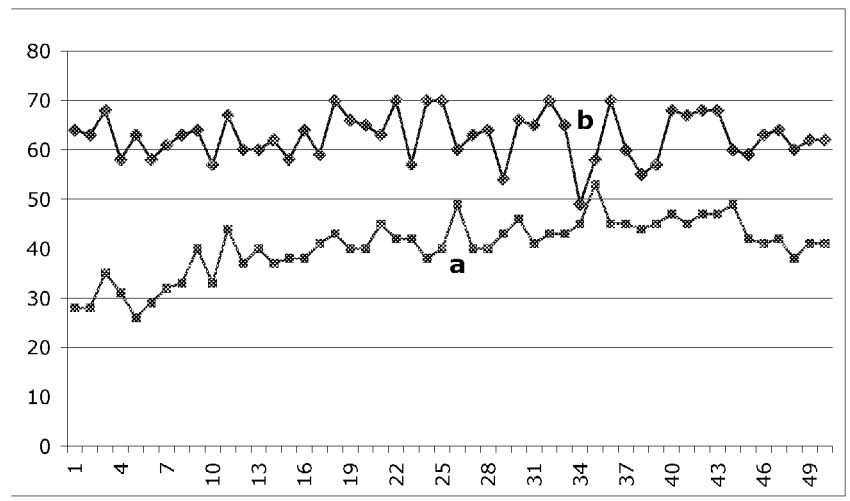
Fig. 3A         Fig. 3B         Fig. 3C
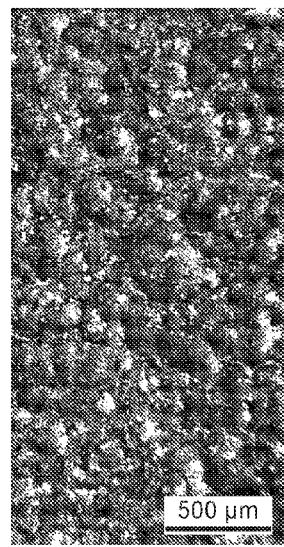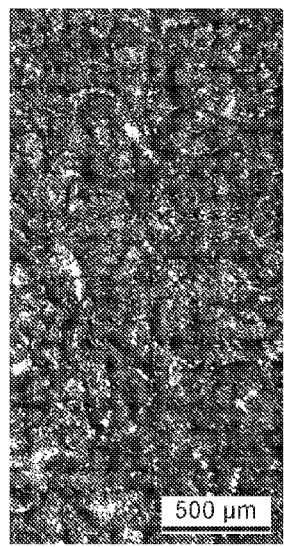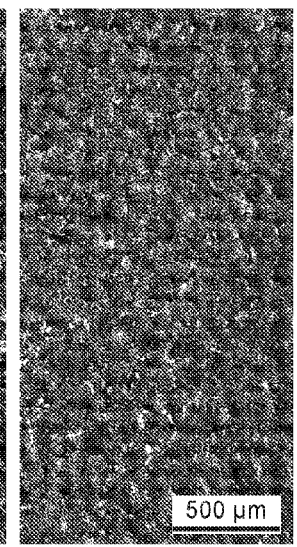

SUCTION BLOWMOLD FOR PRODUCING EXTRUSION SUCTION-BLOWMOLDED PLASTIC MOLDED PARTS

RELATED FIELD OF TECHNOLOGY

The present invention relates to a suction blowmold having a cavity for producing extrusion suction-blowmolded plastic molded parts using the suction-blowing method, in which an extruded, plastically deformable preform in the form of a plastic melt tube is brought into the closed cavity and into position in the cavity at least partially sliding on a mold surface. The present invention additionally relates to a method for producing such a suction blowmold, the use thereof for producing extrusion suction-blowmolded plastic molded parts, and corresponding extrusion suction-blowmolded plastic molded parts.

RELATED PRIOR ART

Hollow bodies made of thermoplastics are currently predominantly produced in the extrusion blowmolding method and in the related stretch blowmolding method [cf. "Einführung in die Kunststoffverarbeitung [Introduction to Plastics Processing]" by Prof. Dr. Walter Michaeli, 4th edition, 1999, published by Carl Hanser Verlag, Munich, Vienna, pages 101-108]. The term hollow bodies is not only restricted to packaging articles, such as bottles, canisters, or barrels, but rather also comprises technical parts, such as ventilation channels, surfboards, suitcase half shells, roof luggage carriers, or automobile gasoline tanks, having a spatial content of a few milliliters (pharmaceutical packages) up to approximately 13,000 l (heating oil tank). The principal method sequence in normal extrusion blowmolding functions as follows: firstly, a tube (preform) having the required length is extruded from a plastic molding compound. The blowmold, which is usually in at least two parts, and is preferably produced from aluminum, then encloses the molten, plastically deformable extrusion tube, which is then cut off by a cutter at the extrusion nozzle. The closed blowmold having the cut-off melt tube, which is closed at both ends by the pinch edges of the mold, is moved to the blowing station, where a blow pin plunges into the blowmold and compressed air is introduced into the cavity of the preform, so that it is inflated into the final form and assumes the contour of the internal shape of the mold. After passage of the cooling time, the blowmold is opened and the finished plastic article is demolded. The demolding and cutting off of the parison waste, i.e., the excess material edges which arise at the pinch edges on the top and bottom upon closing of the blowmold, is typically performed automatically. Depending on the design of the plastic molded part, parison waste may arise whose total weight is a few percent up to multiple times the molded weight part. This parison waste must be fed as soon as possible to cutting mills, to be able to then feed it again to the extruder as so-called reclaimed material.

The production of curved, three-dimensionally oriented parts having partially differing strain and functional criteria is only possible in a limited way in the typical extrusion blowmolding method. Excess pinching in the (curved) mold partition seam areas results in high scrap proportions (parison waste proportions), in particular in the pinch longitudinal areas (i.e., not only on the top and bottom). Excess pinching additionally results in functional restrictions (not least due to the longitudinal seams in the wall of the parts) because of severe irregularities in the wall thickness distribution and weak points connected thereto [cf. FIG. 1 of the professional article "Abfallarmes Blasformen komplexer Formteile [Low-waste Blowmolding of Complex Molded Parts]" by E. Renford-Sasse, Kunststoffe [Plastics] 1993/9, Carl Hanser Verlag, Munich; and "Trends in der Blasform-Technologie [Trends in Blowmolding Technology]", Fachtagung des Süddeutschen Kunststoff-Zentrums [Minutes of the Southern German Plastic Center] of 21 Jun. 1994, presentation by Dipl.-Ing. W. Daubenbüchel: Verfahrens-und Maschinentechnik der 3D-Technologie [Method and Machine Techniques of 3-D Technology]. In the cited presentation, multiple possible solutions are cited in a refinement of typical extrusion blowmolding for the production of multidimensional (3-D) curved products free of pinch seams:
 a) tube extrusion and laying of the preform in an open blowmold half according to the article contour,
 b) manipulation of the preform using gripper elements, vacuum, and/or air showers, and
 c) a combination of ways a) and b), and
 d) suction blowmolding (cf. page 71 of the presentation document, having the basic patent U.S. Pat. No. 4,645,447 of Sumitomo).

The refined method variants are not only used in the production of pipes or hollow bodies made of a single plastic material, but rather also often in connection with sequential coextrusion. Sequential coextrusion combines different materials in the longitudinal direction during the preform production. Materials having different properties in regard to flexibility, stability, strength, and thermoforming stability are combined. In the simplest application, it is a combination of two materials having different hardnesses. Thus, for example, basic parts having flexible end zones and less flexible middle part are produced in one work step (soft—hard—soft). In particular air intake pipes or ventilation pipes require combinations of this type, so that good mounting and sealing of the end zones by hose clamps and sufficient stability in the middle area (to partial vacuum or excess pressure, depending on use) are ensured. Preferred material combinations for hard/soft molded parts are polypropylene and EPDM, polyamide with elastomer-modified polyamide, as well as polybutylene terephthalate with elastomer-modified polyester. Both blowmolding technologies "blowmolding free of pinch seams and sequential coextrusion, usually in combination" are thus particularly suitable for producing molded parts which have been manufactured from rubber materials up to this point. In comparison to rubber materials, significantly shorter cycle times may be implemented if TPE materials are used. The typical applications are, above all, parts for automobile and machine construction, such as axle collars, intake hoses, intake manifolds, steering collars, filtered air hoses, shock absorbers, connecting pipes, hot air hoses, etc. Using suction blowmolding, multidimensional curved plastic molded parts, such as oblong air guiding pipes wound multiple times for the engine compartments of automobiles, may be produced without pinch seams (cf. U.S. Pat. No. 4,645,447). Further examples of extrusion-blowmolded and/or suction-blowmolded parts are known to those skilled in the art from the following patent specifications: EP 0 659 534 B1 (sequential coextrusion in a multilayered coolant line), EP 0 659 535 B1 (extrusion blowmolding of a multilayered coolant line having varying layer thickness ratio, combined with 3-D tube manipulation), EP 0 863 351 B1 (special corrugated pipe geometry for fluid lines).

In the suction-blowing method, the preform tube is suctioned during its extrusion through the closed blowmold located underneath. The blowmold itself comprises the main part (consisting of two halves) having the mold cavity and slider elements, which are actuated independently of one another, preferably hydraulically, and may close the cavity at the top and bottom sides. A suction device is preferably attached to the mold bottom side [cf. "Blasformbare Polyamide [Blowmoldable Polyamides], W. Pfleger et al., Kunststoffe [Plastics] 86 (1996)1, pages 61-65 (in particular FIG. 6), Carl Hanser Verlag, Munich]. The suction-blowing method (and also tube manipulation) allows processing in all materials typical in extrusion blowmolding. This comprises all thermoplastically processable molding compounds, and/or, as their matrix, polymers such as polyolefins, but also polyamides and thermoplastic elastomers based on polypropylene, polyester, or polyamide. Complex geometries are also producible, while in contrast narrow curve radii may result in problems in the suction-blowing method, such as hanging of the preform on surfaces of the blowmold. The suction-blowing method has the following advantages in comparison to other 3-D methods [as described, for example, in "Abfallarmes Blasformen komplexer Formteile [Low-Waste Blowmolding of Complex Molded Parts] by E. Renford-Sasse, Kunststoffe [Plastics] 1993/9, Carl Hanser Verlag, Munich]:

lower investment costs result for machine and mold even for smaller lot sizes,
  the technology, which is simple to handle, without undesired lateral pinches (reduced parison waste and no occurrence of weak points in the form of a pinch seam), allows the use of smaller extruders and assemblies for parison waste processing,
  the better control of the wall thickness distribution of the blowmolded part allows optimal material exploitation,
  multiple manufacturing in 3-D technology of two identical articles in one work cycle on machines having double storage heads is possible.

It has thus been disclosed in the prior art that complex geometries and in particular narrow curve radii may result in problems in suction blowmolding. These problems, which result above all when the preform is suctioned in or through the mold cavity, in that the plastic melt tube remains at least temporarily stuck to the mold surface, have been recognized. "Air lubrication" in the form of compressed air nozzles, which are preferably situated on the awkward and/or exposed points of the mold surface, at which direction changes are forced on the suctioned preform, is known from U.S. Pat. No. 4,865,799 and/or EP 0 301 694 B2. This compressed air reduces the friction between the extruded, plastically deformable plastic melt tube and mold surfaces of the closed cavity of a suction blowmold when the plastic melt tube is suctioned in and through. However, providing such air nozzles, having the required connections, and the compressed air supply significantly complicates the suction blowmold, which makes the production of the plastic molded parts significantly more expensive.

OBJECTS AND SUMMARY OF THE PRESENT INVENTION

The object of the present invention is to reduce the friction between an extruded, plastically deformable preform in the form of a plastic melt tube and mold surfaces of a closed cavity of a suction blowmold as the plastic melt tube is suctioned in and through in an alternative way, without significantly increasing the production costs for the suction blowmold.

This object is achieved according to a first aspect in that an alternative suction blowmold is suggested. This suction blowmold having a cavity for producing extrusion suction-blowmolded plastic molded parts using the suction-blowing method, in which an extruded, plastically deformable plastic melt tube is brought into the closed cavity and into position in the cavity at least partially sliding on a mold surface, is characterized in that at least a part of the mold surface of the cavity has a structuring, which provides a reduced sliding friction to the plastic melt tube.

This object is achieved according to a second aspect in that a method for producing a corresponding, alternative suction blowmold is suggested. This method is characterized in that a structuring is produced on at least a part of the mold surface of the cavity which provides a reduced sliding friction to the plastic melt tube.

This object is achieved according to a third aspect in that the use of a corresponding, alternative suction blowmold for producing extrusion suction-blowmolded plastic molded parts is suggested. This use is characterized in that at least a part of the mold surface of the cavity has a structuring which provides a reduced sliding friction to the preform.

This object is achieved according to a fourth aspect in that an alternative, extrusion suction-blowmolded plastic molded part is suggested. This plastic molded part, which has been brought as an extruded, plastically deformable preform in the form of a plastic melt tube into the closed cavity and into position in the cavity at least partially sliding on a mold surface according to the present invention, is characterized in that it has an impression of the structuring of the mold surface according to the present invention on its surface.

The plastic melt tube and/or the finished plastic molded part may be made of any molding compound capable of extrusion suction blowmolding. Polymers such as polyolefins, but also polyamides and thermoplastic elastomers based on polypropylene, polyester, or polyamide are preferred as the matrix for the molding compound. Polyamides and polyamide elastomers and also mixtures of polyamides and/or polyamide elastomers are especially preferred. These may contain the typical additives and additional materials such as reinforcing agents or also viscosity-increasing additives (for sufficiently high melt strength). What are to be understood as polyamides and polyamide elastomers does not need to be explained in greater detail here, because this is known to those skilled in the art, e.g., from the Plastics Handbook 3/4 "Polyamide [Polyamides]", edited by L. Bottenbruch and R. Binsack, Carl Hanser Verlag Munich Vienna 1998 (polyamide elastomers in chapter 8). Examples of suitable extrusion blowmolding compounds (preferably based on polyamides) are additionally described in EP 1 394 197.

For the special case of sequential coextrusion, combinations of at least two molding compounds are used, which have to have sufficient adhesion to one another, of course. In the polymers for the corresponding matrices, combinations which are made of polypropylene and EPDM, polyamide and elastomer-modified polyamide (polyamide elastomers), and polybutylene terephthalate and elastomer-modified polyester are preferred, for example.

Refined and preferred implementations of the suction blowmold according to the present invention, the method for producing an alternative suction blowmold, the use of an alternative suction blowmold for producing extrusion-suction-blowmolded plastic molded parts, and the alternative extrusion suction-blowmolded plastic molded parts result from the dependent claims.

Advantages of the present invention comprise:
  The use of lubricants such as oil, e.g. silicone sprays or silicone oil, as is often required in the current prior art for reducing the friction between an extruded, plastically deformable plastic melt tube and typical mold surfaces of a closed cavity of a suction blowmold as the plastic melt tube is suctioned in and through, makes subsequent welding of attachment parts to the plastic component more difficult or impossible. The structuring according to the present invention of at least a part of the mold surface of the cavity of allows dispensing with such lubricants, because the production runs without interference and optimally even without lubricants, even using the preferred polyamides and polyamide elastomers, which do not slide well on metallic surfaces in the molten state.

The use of the suction blowmold according to the present invention having a structuring of the mold surface of the cavity allows the production of extrusion suction-blowmolded plastic molded parts which are more scratch resistant, having uniform matte surfaces, i.e., the impression of the structuring according to the present invention on the surface of the plastic molded part also provides a usage advantage for the molded part itself. Production and improvement methods for producing photo-grained surfaces may thus be dispensed with [cf. "Die strukturierende Formnestoberfläche und deren Abformung durch Thermoplaste [The Structuring Mold Nest Surface and Its Imprint by Thermoplastics]" by Dieter Schauf, in "Anwendungstechnische Information [Application Technology Information] ATI 584" from Bayer of May 4, 1994].

Fundamentals and aspects of the present invention will be explained in greater detail on the basis of schematic drawings and selected exemplary embodiments.

BRIEF DESCRIPTION OF THE FIGURES

FIG. 1 shows a section through a suction blowmold known from the prior art,

FIG. 2 shows a statistic about the parison waste length (as a measure for the sliding properties), which has been achieved using different mold surfaces, (a) using a typical surface and (b) using a surface according to the present invention;

FIG. 3 shows microscopic images of mold surfaces processed according to the present invention and corresponding surfaces of extrusion suction-blowmolded plastic molded parts, FIG. 3A showing the mold surface after the structuring by sandblasting using quartz sand;

FIG. 3B showing the mold surface after compaction by shot blasting using glass beads; and FIG. 3C showing the finished surface of a plastic molded part produced using the suction blowmold according to the present invention;

DETAILED DESCRIPTION OF THE PRIOR ART

Figure 1A:
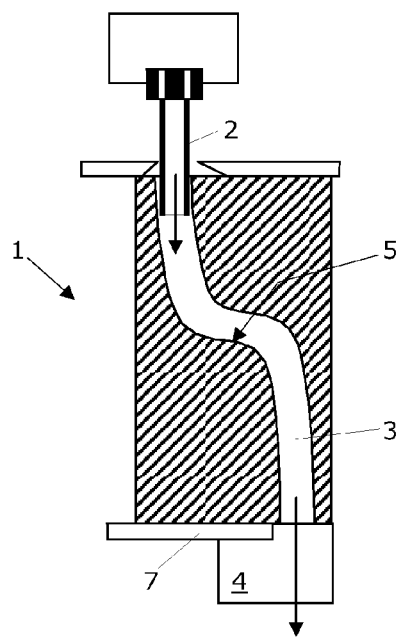
FIG. 1A showing the introduction of the preform into the cavity of the mold using suction support.
Figure 1B:
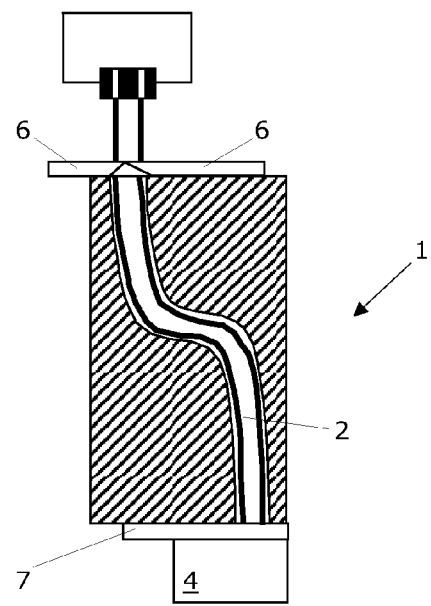
FIG. 1B showing the clamping of the preform and the closing of the cavity.

FIG. 1 shows a section through a suction blowmold 1 known from the prior art. The introduction of the preform 2 into the cavity 3 of the mold 1 (cf. FIG. 1A) is preferably performed from above, so that gravity, which acts on the preform 2, in the form of an extruded, plastically deformable plastic melt tube, allows the introduction. The support of this procedure, in which the melt tube travels downward in the coiled channel of the closed tool, using a suction device 4 preferably situated below the blowmold 1 is especially preferred. The preform 2 slides into the closed cavity 3 and is brought into position in the cavity at least partially sliding on the mold surface 5. It is obvious that the tendency of the plastic melt tube 2 to hang on the mold surface is greatest at the exposed points of the mold surface (identified here by an arrow and the reference numeral 5). For this reason, supporting air nozzles have been suggested at precisely these points in U.S. Pat. No. 4,865,799 and EP 0 301 694 B2.

Figure 6:
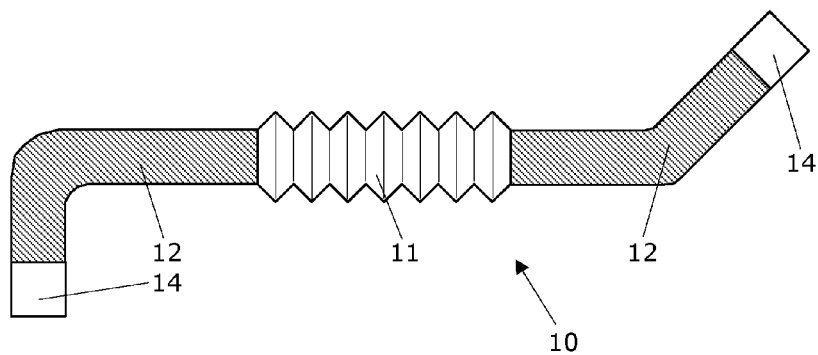
FIG. 6 shows a view of a plastic molded part produced using sequential coextrusion, which comprises a soft, flexible bellows between the two hard, stable end parts, which are equipped with soft, flexible attachment parts.

The clamping of the preform 2 and the closing of the cavity 3 are preferably performed by a top, two-part slider 6 (cf. FIG. 1B), while the bottom side of the cavity 3 may be closed using a one-part slider 7 or preferably also using a two-part slider (cf. FIG. 6 in the article "Blasformbare Polyamide [Blowmoldable Polyamides]" cited at the beginning).

Figure 1C:
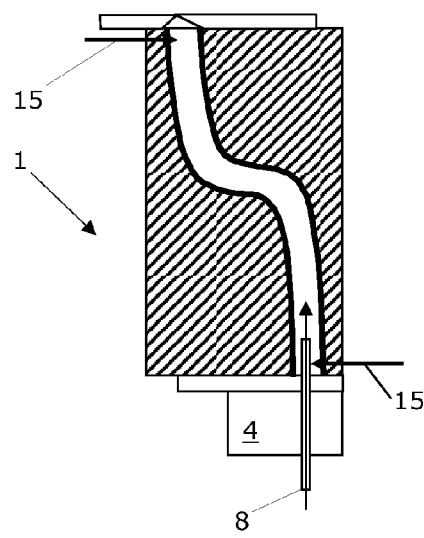
FIG. 1C showing the blowmolding of the plastic molded part.

To inflate the plastic molded part during the suction blowmolding, either a blow pin 8 is used, or blow needles 15 are inserted from the side at the ends of the tube, which pierce through the tube wall through holes introduced into the mold halves as cannulae (cf. horizontal arrows in FIG. 1C). The possible variants (inter alia, also flushing air methods combined therewith for faster cooling) are known to those skilled in the art. By injecting compressed air and/or an inert gas at a few bar of pressure, the plastic melt tube pre-shaped using extrusion is expanded in diameter and pressed uniformly onto the mold surface 5 of the cavity 3, until it has assumed the definitive shape of the plastic molded part 10.

Figure 1D:
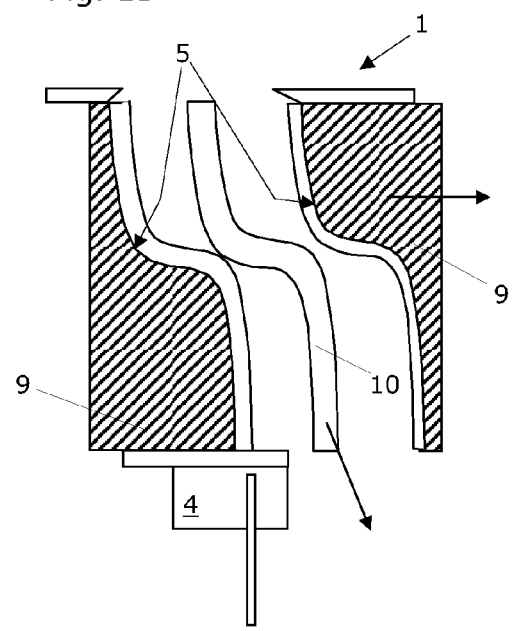
FIG. 1D showing the opening of the mold and the demolding of the plastic molded part.

After the cooling of the plastic molded part 10, the two mold halves 9 are separated from one another and the plastic molded part is demolded (cf. FIG. 1D). The demolding is preferably performed using ejectors (not shown) attached in the mold.

DETAILED DESCRIPTION OF THE PRESENT INVENTION

In the following, the production of the suction blowmold according to the present invention and its use are explained in greater detail:

According to the object stated at the beginning, one may initially also consider using a smaller extruder nozzle without modification on the suction blowmold. The external diameter of the pre-shaped plastic melt tube would thus be reduced, which would possibly also reduce the undesired hanging of the preform 2 on the mold surface 5 of the cavity 3 and thus also uncontrolled lengthening of the preform 2. The tendency, which is also undesired, of the plastic melt tube to stick together in its interior (because of the corresponding smaller internal diameter of the tube) would also be reinforced, however. Therefore, the clear goal is to bring a plastic melt tube having the largest possible diameter into the cavity 3 of the mold 1 and to position it therein using through suctioning without impairment and reproducibly for blowmolding.

A further achievement of the object formulated at the beginning which is known per se has been to apply a silicone spray or silicone oil to the mold surface 5 and thus reduce the friction between an extruded, plastically deformable plastic melt tube 2 and these mold surfaces 5 of a closed cavity 3 of the suction blowmold 1 during suctioning in and through. However, it is known that the use of such lubricants (neglecting the slippery working conditions) makes subsequent welding of attachment parts to the plastic component more difficult or impossible. The idea according to the present invention was therefore to begin in the surface of the suction blowmold.

High-viscosity polyamide and polyamide-elastomer molding compounds were used for the experiments, as are produced and distributed by the current applicant for use in the field of media-guiding systems. In particular for air guiding parts in the engine compartment of automobiles, high requirements are placed in regard to high strength, rigidity, and thermoforming strength. These requirements are fulfilled by polyamides, such as Grilon® R 50 HNZ, Grilon® RVZ-15H, and Grilon® ELX 40 HNZ (the latter is a polyamide elastomer) (Grilon® is a registered trademark of EMS-CHEMIE AG). These materials offer high consistency in regard to the tube stability and the processability, so that they are best suitable for use in 3-D technology using suction blowmolding.

All experiments were performed using a commercially available extrusion suction blowmolding facility, and various mold surfaces 5 were examined for their suitability. In small batches of 50 specimens, the reject proportion and the occurring parison waste length, i.e., the parison waste coming out on the bottom were measured (illustration in FIG. 2, explanation below), and the reproducibility of these results was judged. In this context, the parison waste was not viewed as waste, but rather as a measure for the quality of the sliding properties, because, with an identical extruded quantity in each case, the tube becomes somewhat longer when it slides perfectly through the cavity.

Firstly, a cavity 3 having smooth-milled mold surface 5 was used to produce tubular preforms 2 having a compound temperature of approximately 230-240° C. Because the reject rate of 70% thus achieved was not able to be significantly reduced in spite of an increased suction power of the suction device 4 from 380 l/min to 500 l/min, it was resolved to rework the mold surface 5 using glass beads. The rejects could be eliminated using these mold surfaces 5 shot blasted using glass beads, however, very strong variations of the parison waste length were measured.

In parallel to these experiments, Topochrom® coatings were examined. These resulted in inconstant parison waste lengths, the reject rate increasing with increasing fineness of the Topochrom® surface and being at most approximately 66%. The high investment costs and the complex production methods also opposed the routine use of these coatings.

Surprisingly, the best results occurred after a milled surface 5 had been subjected to a combined treatment using sandblasting and subsequent shot blasting.

FIG. 2 shows a comparison of the achieved results in the form of a diagram: the parison waste length measured after drying (overnight at 80° C.) is plotted on the ordinate (in mm) and the number of the particular 50 specimens is plotted on the abscissa. Notwithstanding the typical consideration, that in commercial production the shortest possible parison waste length is to be achieved or set (so as not to cause unnecessary material waste), this test was based on the assumption that a greater parison waste length exiting beyond the suction blowmold at equal extrusion mass indicates that the suction blowmold was passed with lower friction and covered more uniformly. Therefore, greater parison waste lengths represent the better results among the test conditions here. In addition, the highest possible reproducibility of the parison waste length, i.e., a small standard deviation thereof, is desirable. The mean value (arithmetic mean) of the parison waste length achieved using a smooth-milled mold surface 5 (cf. a) was 40.44 mm. In contrast, the parison wastes from the mold surface 5 according to the present invention, which was treated using sand and shot blasting (cf. b), were significantly longer and were 62.74 mm on average. The standard deviations calculated from each 50 specimens also clearly indicate that the combined blasting treatment (standard deviation of b=4.73 mm) allows significantly more reproducible parison waste lengths than the smooth-milled mold surface 5 (standard deviation of a=5.80 mm).

The method according to the present invention for processing the cavity 3 of a suction blowmold 1 for producing extrusion suction-blowmolded plastic molded parts using the suction-blowing method comprises the following work steps:

A) Sandblasting the milled mold surface 5 using quartz sand having a particle size of 0.2 to 2 mm. The quartz sand was blasted onto the mold surface at an air pressure (overpressure) of 2-8 bar for a time of 0.5-5 minutes. Especially good results were obtained using quartz sand whose particle size was 0.7 to 1 mm and which was blasted onto the mold surface at an air pressure of 4 bar for a time of 2 minutes.

B) Sandblasting the milled mold surface 5 using ocean sand. The ocean sand was blasted onto the mold surface at an air pressure of 2-8 bar for a time of 0.5-5 minutes. Especially good results were obtained using ocean sand whose particle size was 0.7 to 1 mm and which was blasted onto the mold surface at an air pressure of 4 bar for a time of 2 minutes.

C) Shot blasting the milled mold surface 5 using glass beads having a diameter of 100 to 1000 μm (corresponding to 0.1 to 1 mm). The glass beads were blasted onto the mold surface at an air pressure of 2-8 bar for a time of 0.5-5 minutes. Especially good results were obtained using glass beads whose diameter was approximately 500 μm (0.5 mm) and which were blasted onto the mold surface 5 at an air pressure of 4 bar for a time of 2 minutes.

FIG. 3 shows microscopic images of the processed mold surfaces 5 according to the present invention of the cavity 3 of a suction blowmold 1 for producing extrusion suction-blowmolded plastic molded parts using the suction-blowing method and/or of the surface of molded parts of this type. The current enlargement factor is approximately 36× in each case, as is obvious from the bar corresponding to 500 μm.

FIG. 3A is a microscopic image of the mold surface 5 of a suction blowmold 1 according to the present invention after the sandblasting using quartz sand having a grain size of 0.7-1.0 mm. The fissured structures on this mold surface 5 are clearly imaged. Any peaks of the structures were subsequently removed by sandblasting using ocean sand.

FIG. 3B shows the mold surface 5 of the suction blowmold 1, after it has been shot blasted, after the sandblasting, using glass beads having a diameter of 500 μm, and thus slightly compacted. This microscopic image thus shows the final stage of the mold surface 5 processed according to the present invention. On one hand, this structuring of the mold surface reduces the possible contact area with the plastic mold tube 2 to be suctioned through. On the other hand, it is to be assumed that air eddies are generated by the suctioning of the preform 2 into the cavity 3 on these surface structures of the cavity 3, which provide a "gaseous lubricating layer", which reduces the sliding friction of the plastic melt tube (preform).

FIG. 3C shows the finished surface of a plastic molded part produced using the suction blowmold 1 according to the present invention. The rough, but quite uniformly structured surface (i.e., the impression of the structuring according to the present invention) appears matte and provides the plastic molded part with an improved appearance, which also is maintained for a long time because of the increased scratch resistance.

The mold surface 5 of the suction blowmold 1 according to the present invention may be characterized by various parameters. These parameters include the roughness values $R_a$ and $R_z$. For the present invention, these two roughness parameters were measured and specified as defined and explained in the "Dubbel" Taschenbuch für den Maschinenbau [Handbook of Mechanical Engineering], edited by W. Beitz and K.-H. Grote, 20th edition, Springer-Verlag Berlin Heidelberg New York 2001, pages F30 through F32. According to pace F31 (left column), $R_a$ is the arithmetic mean of all absolute profile deviations upward and downward (calculated outward from the center line at mean height) within a measured reference distance on the surface of the examined body. According to page F31 (right column), the surface roughness value $R_z$ is a measure of the largest occurring profile deviations. The definition from the second paragraph in the right column of page F 31 was used, which also refers to DIN 4768. Accordingly, $R_z$ is the mean value of the individual surface roughnesses of a total of five reference measurement distances.

To illustrate the orders of magnitude and/or for comparative purposes, the following table known from machining is used.

TABLE 1 comparison of roughness values

| DIN ISO 1302 | Roughness value $R_a$ [μm] | 0.025 | 0.05 | 0.1 | 0.2 | 0.4 | 0.8 | 1.6 | 3.2 | 6.3 | 12.5 |
|---|---|---|---|---|---|---|---|---|---|---|---|
| | Roughness class | N1 | N2 | N3 | N4 | N5 | N6 | N7 | N8 | N9 | N10 |
| Supplementary sheet 1 to DIN 4768/1 | Surface roughness $R_z$ [μm] | 0.1 to 0.8 | 0.25 to 1.6 | 0.4 to 2.5 | 0.8 to 4 | 1.6 to 6.3 | 3.15 to 12.5 | 6.3 to 20 | 12.5 to 31.5 | 25 to 63 | 40 to 100 |

(adapted from the FLENDER-Taschenbuch [Handbook], 3rd edition July 2000, © by FLENDER AG, Bocholt, Germany)

The corresponding N classes are also entered in this table, as are used above all in Switzerland and the USA. Estimations derived from the preform measurements and/or from the microscopic images result in a preferred range for the $R_a$ value between 0.8 and 6.3 μm for the surface according to the present invention of the suction blowmold. This corresponds to an accordingly also preferred $R_z$ value in the range from 6 to 40 μm and/or to one of the roughness classes N6 through N9. Structuring of the mold surface having a $R_a$ value of approximately 3 μm and an $R_z$ value in the range of 20 μm is very especially preferred. These values correspond to the roughness class N8.

Furthermore, it was observed that cooling and/or temperature control of the suction blowmold additionally reduced the sliding friction and thus further improved the obtained results. A suction blowmold according to the present invention is therefore preferably implemented as coolable. At least the mold surface is preferably made of aluminum. The suction blowmold is preferably temperature controlled to a temperature in the range from 20 to 120° C.; a temperature in the range from 60 to 80° C. is especially preferred.

All mold surfaces 5 are preferably provided with a surface structuring according to the present invention. A uniform visual aspect of the surface of the plastic molded part is thus generated. However, it is also possible to only treat specific, selected parts of the mold surface 5. This may be applied if soft, flexible parts must fulfill a sealing function or if the visual aspect is negligible. In particular in the latter case, only the exposed points of the mold surface 5 would be processed using a combined sand/glass bead blasting treatment, to make introducing and suctioning through the preform 2 in the cavity 3 of a suction blowmold easier.

The compound temperature of the extruded preform (plastic melt tube) upon introduction into the suction blowmold is preferably in the range from 200 to 285° C. (adapted to the melting point and the viscosity of the corresponding plastic molding compounds). This compound temperature is especially preferably in the range from 220 to 250° C.

Figure 4:
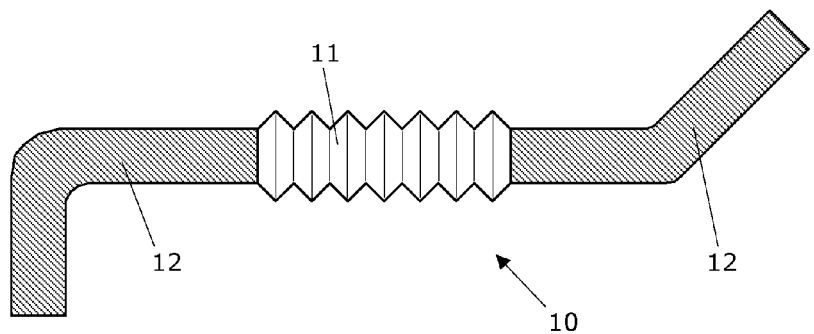
FIG. 4 shows a view of a plastic molded part produced using sequential coextrusion, which comprises a soft, flexible bellows between the two hard, stable end parts.
Figure 5:
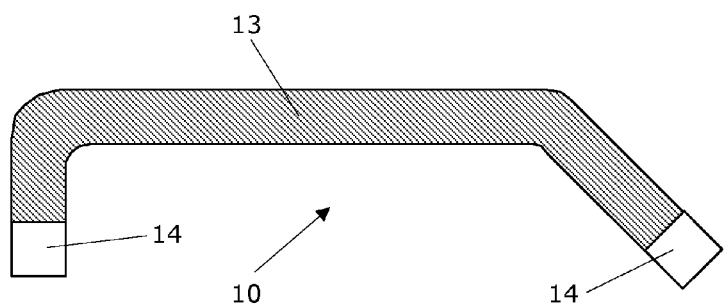
FIG. 5 shows a view of a plastic molded part produced using sequential coextrusion, which comprises a hard, stable middle part and a soft, flexible attachment part at each end.

In the following, to illustrate the possible uses of sequentially coextruded, extrusion suction-blowmolded plastic molded parts, specific embodiments are schematically shown in FIGS. 4 through 6, which are taken in part from "Trends in der Blasform-Technologie [Trends in Blow Molding Technology]", Fachtagung des Süddeutschen Kunststoff-Zentrums [Minutes of the Southern German Plastic Center] of 21 Jun. 1994, presentation by Dipl.-Ing. W. Daubenbüchel: Verfahrens-und Maschinentechnik der 3D-Technologie [Method and Machine Techniques of 3-D Technology], page 78.

FIG. 4 shows a view of a plastic molded part 10 according to a first embodiment. This molded part resulted from a preform 2 produced using sequential coextrusion and comprises a soft, flexible bellows 11 between two hard, stable end parts 12, which are provided with the surface structuring according to the present invention.

FIG. 5 shows a view of a plastic molded part 10 according to a second embodiment. This molded part resulted from a preform 2 produced using sequential coextrusion and comprises a hard, stable middle part 13 having a surface structuring according to the present invention and a soft flexible attachment part 14 at each end.

FIG. 6 shows a view of a plastic molded part 10 according to a third embodiment. This molded part resulted from a preform 2 produced using sequential coextrusion and comprises a soft, flexible bellows 11, which is situated between two hard, stable end parts 12. These end parts 12 have a surface structuring according to the present invention and are equipped with soft, flexible attachment parts 14.

An elastomer-modified polyamide, i.e., a polyamide elastomer, is preferably used for soft, flexible parts, such as for the bellows 11 and the attachment parts 14. In addition, a molding compound based on polyamide is preferably used for the hard, stable parts or sections such as the end parts 12 or the middle part 13. If a plastic molded part 10 does not have any soft, flexible parts (not shown), the same polyamides are used for its production as are preferred for the stable end parts 12 or the middle part 13. However, vice versa, if the entire plastic molded part is to have certain flexibility, it may be produced entirely from a molding compound having a polyamide elastomer as the matrix, for example, from Grilon® ELX 40 HNZ (as already noted in the experiments).

If a plastic molded part 10 is produced using the suction blowmold 1 according to the present invention, which is a multidimensional (two-dimensional or three-dimensional) molded component for automobile construction or machine construction, in particular an air guiding part for the engine compartment of automobiles, a bellows 11 (i.e., a corrugated part) prevents the transmission of vibrations to other components, for example. Hose clamps (not shown) may be attached to the soft, flexible attachment parts 14, which are used for mutual, sealing fastening of the plastic molded part and any supply and exhaust lines.

In addition to sequentially coextruded and/or multilayered plastic molded parts, of course, the present invention also comprises plastic molded parts 10 which comprise a single material (molding compound), as well as arbitrary combinations of the disclosed embodiments, produced using a suction blowmold according to the present invention.

LIST OF REFERENCE NUMERALS 1 suction blowmold
2 preform, plastic melt tube
3 cavity
4 suction device
5 mold surface
6 top slider
7 bottom slider
8 blow pin
9 mold halves
10 plastic molded part
11 soft, flexible bellows
12 hard, stable end parts
13 hard, stable middle part
14 soft, flexible attachment parts
15 blow needles

What is claimed is:

1. A suction blowmold, having a cavity formed by two mold halves for producing extrusion suction-blowmolded plastic molded parts using the suction blowmold method, in which an extruded, plastically deformable preform in the form of a plastic melt tube is brought into the closed cavity and into position in the cavity at least partially sliding on a mold surface, the suction blowmold comprising a suction device for introducing the preform into the closed mold halves, wherein at least a part of the mold surface of the cavity has a structuring formed directly into the mold surface, said structuring having an $R_a$ value between 0.8 and 6.3 μm and an $R_z$ value in the range from 6 to 40 μm and providing a reduced sliding friction to the preform.

2. The suction blowmold according to claim 1, wherein the structuring of the mold surface in the majority of cases has multiple depressions produced by sandblasting the previously milled mold surface.

3. The suction blowmold according to claim 1, wherein the structuring of the mold surface has a $R_a$ value of approximately 3 μm and a $R_z$ value in the range of 20 μm.

4. The suction blowmold according to claim 1, which comprises two sliders for terminating the cavity formed by the closed mold halves on both sides.

5. The suction blowmold according to claim 1, which is implemented as temperature controllable.

6. The suction blowmold according to claim 1, wherein at least the mold surface of the cavity is made of aluminum.

* * * * *